US008724041B2

(12) United States Patent
McKnight et al.

(10) Patent No.: US 8,724,041 B2
(45) Date of Patent: May 13, 2014

(54) DRIVE SCHEME FOR STEREOSCOPIC DISPLAY POLARIZATION MODULATOR AND APPARATUS FOR SAME

(75) Inventors: Douglas J. McKnight, Boulder, CO (US); Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 13/473,447

(22) Filed: May 16, 2012

(65) Prior Publication Data

US 2012/0293753 A1 Nov. 22, 2012

Related U.S. Application Data

(60) Provisional application No. 61/486,707, filed on May 16, 2011.

(51) Int. Cl.

| | |
|---|---|
| ***G02F 1/1335*** | (2006.01) |
| ***G09G 5/00*** | (2006.01) |
| ***G09G 3/18*** | (2006.01) |
| ***G09G 3/36*** | (2006.01) |
| ***G06F 3/038*** | (2013.01) |

(52) U.S. Cl.
USPC ....... 349/15; 345/6; 345/38; 345/95; 345/210

(58) Field of Classification Search
USPC ....................... 345/6, 38, 95, 97, 210; 349/15
See application file for complete search history.

(56) References Cited

U.S. PATENT DOCUMENTS

| | | | | |
|---|---|---|---|---|
| 4,281,341 | A | 7/1981 | Byatt | |
| 4,719,507 | A | 1/1988 | Bos | |
| 4,792,850 | A | 12/1988 | Lipton | |
| 4,884,876 | A | 12/1989 | Lipton | |
| 6,975,345 | B1 | 12/2005 | Lipton et al. | |
| 8,023,052 | B1 * | 9/2011 | Osterman et al. | 349/15 |
| 8,199,070 | B2 * | 6/2012 | Cowan et al. | 345/6 |
| 2002/0097207 | A1 * | 7/2002 | Pfeiffer et al. | 345/87 |
| 2007/0229951 | A1 | 10/2007 | Jung et al. | |

OTHER PUBLICATIONS

File History of U.S. Appl. No. 61/352,773 entitled "Stereoscopic Liquid Crystal Display Systems," filed Jun. 8, 2010.

File History of U.S. Appl. No. 12/853,273 entitled "Segmented polarization control panel," filed Aug. 9, 2010.

File History of U.S. Appl. No. 61/306,897 entitled "Plastic Liquid Crystal Polarization Switch for Direct View Stereoscopic Display," filed Feb. 22, 2010.

File History of U.S. Appl. No. 12/985,250 entitled "Crosstalk suppression in time sequential liquid crystal stereoscopic display systems," filed Jan. 5, 2011.

International search report and written opinion of international searching authority for PCT/US12/38191 mailed Dec. 28, 2012.

* cited by examiner

*Primary Examiner* — Edward Glick
*Assistant Examiner* — Dennis Y Kim
(74) *Attorney, Agent, or Firm* — Neil G. J. Mothew; Darlene K. Kondo

(57) ABSTRACT

An improved drive scheme for a segmented polarizing modulator (or Polarization Control Panel) for use in an electronic stereoscopic display. The segmented polarization modulator segments are arranged contiguously in a direction of the sequential scan. The liquid crystal material used in each segment is driven in a manner to reduce the visibility of segment boundaries, by applying a positive or negative transition voltage (+T or −T volts) for a short period of time prior to applying +H and −H drive voltages. Optionally, the transition voltage may also be applied in transitioning from +H and −H drive voltages.

53 Claims, 7 Drawing Sheets

DRIVE SCHEME FOR STEREOSCOPIC DISPLAY POLARIZATION MODULATOR AND APPARATUS FOR SAME

CROSS-REFERENCE TO RELATED APPLICATIONS

This application is a non-provisional conversion of, and thus claims priority to, U.S. Provisional Patent Application No. 61/486,707, filed May 16, 2011, and entitled Drive Scheme for Stereoscopic Display Polarization Modulator and Apparatus for Same," which is incorporated herein in its entirety.

TECHNICAL FIELD

This disclosure generally relates to a drive scheme for a segmented polarization modulator for a stereoscopic display, and more specifically relates to an improved drive scheme for driving the polarization modulator segments to minimize perceptible lines between them.

BACKGROUND

Some conventional techniques for modulating polarization for a stereoscopic display are described by Lipton in commonly-owned U.S. Pat. No. 6,975,345 ("Lipton '345"), and by Byatt in U.S. Pat. No. 4,281,341 ("Byatt '341"), both of which are incorporated herein by reference.

In general, Lipton '345 describes a polarizing modulator for use in an electronic stereoscopic display system having a sequentially scanning display that includes a plurality of liquid crystal segments arranged contiguously in a direction of the sequential scan. The liquid crystal material used in each polarization modulation segment has its phase shift tuned in an attempt to minimize the perception of a visible line between segments. Byatt '341 describes a stereoscopic television system that employs a switchable optical polarizer to alternately form images corresponding to the left and right eyes on a television camera. A corresponding switchable polarizer, which comprises a liquid crystal cell containing a thin layer of twisted nematic liquid crystal material, is used in combination with a display device to produce alternating images that are vertically or horizontally polarized. The switchable polarizer associated with the display device is switched in synchronism with the operation of the switchable polarizer associated with the camera.

FIG. 4 is a schematic diagram of a conventional Byatt modulator 401 and FIG. 5 is a schematic waveform diagram illustrating Lipton's known drive scheme for driving a Byatt modulator 401 (shown in FIG. 4), in which the phase shift is tuned by applying a bias voltage to the liquid crystal in its low state. As described therein, Lipton '345 teaches the waveform having portion 501, which has a positive voltage of value +H and portion 503, which has a negative voltage of value −H. In Lipton '345, the device is driven between +H and −H volts (typically between 15 and 20 volts). Lipton '345 teaches driving the shutter at 40 volts peak-to-peak, where +H is 20 volts and −H is −20 volts. Each quarter cycle of the waveform has a duration T and each quarter cycle interval is signified by the designations A, B, C, D. The Byatt modulator 401 is driven to plus or minus H volts for equal durations T. Waveform portions 502 and 504 are defined as the bias voltage. These intervals B and D are of the same duration T as intervals A and C. The bias voltage for intervals B and D have a value of plus and minus L volts, respectively.

Unfortunately, in practice, the technique disclosed in Lipton '345 may, in some circumstances (such as high speed action/motion image sequences), still show slightly perceptible lines between segments of the display device when used with his disclosed scheme.

SUMMARY

In order to overcome deficiencies found in conventional approaches such as those discussed above, disclosed herein are embodiments of a polarizing modulator, and related methods of driving a polarizing modulator, for use with an electronic stereoscopic display system having a sequentially scanning display comprised of multiple display segments. In accordance with the disclosed principles, the liquid crystal material used in each segment is driven in a manner to reduce the visibility of segment boundaries by applying a positive or negative transition voltage for a short period of time prior to applying positive and negative drive voltages. Use of the transition voltage on a first polarization modulation segment that is adjacent to a second polarization modulation segment driven at an opposite state causes less disruption to the adjacent modulation segment, yet accomplishes much of the switching desired of the first polarization modulation segment.

In exemplary embodiments, a polarizing modulator may comprise a plurality of segments each containing liquid crystal material and arranged contiguously in a direction of the sequential scan, as well as driving circuitry coupled to each segment and configured to individually drive the liquid crystal film in each segment to a desired polarization modulating state. The driving circuitry, as well as related techniques for driving segments of a polarizing modulator, may drive the segments by providing a positive low drive voltage to a first segment for a first time period, where the positive low drive voltage is insufficient to switch the first segment to a first polarization modulating state. Next, the positive low drive voltage is increased to provide a first positive transition voltage to the first segment for a first transition time period, where the first positive transition voltage is sufficient to drive liquid crystal in the first segment towards the first polarization modulating state without creating a lateral electric field of significant magnitude to significantly affect liquid crystal in a second segment immediately adjacent to the first segment. Additionally, the first positive transition voltage is increased to provide a positive high drive voltage to the first segment for a second time period, where the positive high drive voltage is sufficient to decisively switch the first segment of the polarization modulator to the first polarization modulating state. Then, the positive high drive voltage may be decreased to provide a second positive transition voltage to the first segment for a second transition time period, where the second positive transition voltage is substantially equal to the first positive transition voltage.

In related embodiments, the driving circuitry and related techniques for driving segments of a polarizing modulator may also provide a negative low drive voltage to the first segment for a third time period, where the negative low drive voltage is insufficient to switch the first segment to a second polarization modulating state. In such embodiments, the negative low drive voltage may also be increased to provide a first negative transition voltage to the first segment for a third transition time period, where the first negative transition voltage is sufficient to drive liquid crystal in the first segment towards a second polarization modulating state without creating a lateral electric field of significant magnitude to significantly affect liquid crystal in the adjacent second segment.

Further, the first negative transition voltage may also be increased to provide a negative high drive voltage to the first segment for a fourth time period, where the negative high drive voltage is sufficient to decisively switch the first segment of the polarization modulator to the second polarization modulating state.

In advantageous embodiments, the segments of a polarizing modulator are each driven to positive and negative high states by the positive and negative high drive voltages in synchrony with an image for a selected eye, and drive to positive and negative low states by the positive and negative low drive voltages in synchrony with an image for a non-selected eye. Moreover, each segment may be driven in substantially the same manner, but with a small lag time, for example, a 1 millisecond lag, for each segment behind the prior contiguous segment to create a scrolling polarization modulator in synchronization with a scrolling liquid crystal modulation panel.

DETAILED DESCRIPTION

Figure 1:
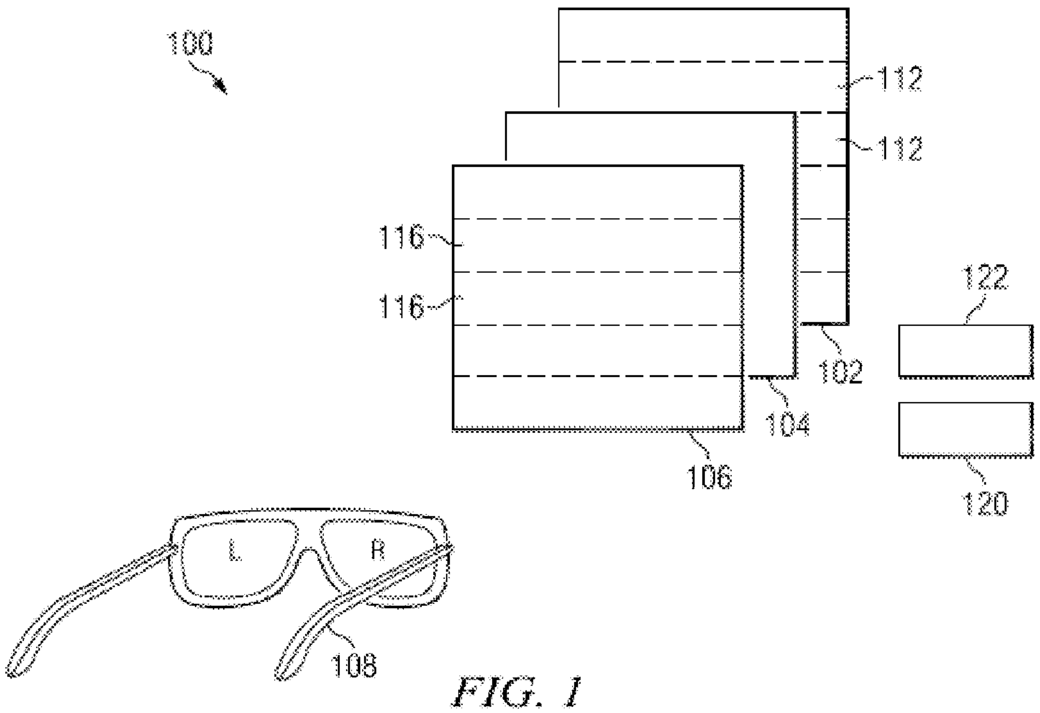
FIG. 1 is a schematic conceptual diagram illustrating an exemplary stereoscopic flat panel display system, in accordance with the present disclosure.

FIG. 1 is a schematic conceptual diagram illustrating an exemplary stereoscopic flat panel display system 100. The system 100 may include a backlight 102, a liquid crystal (LC) modulation panel 104, and a polarization control panel (PCP) 106. The system 100 may also include a controller 122 providing control interfaces and/or instructions for controlling the backlight 102, LC modulation panel 104, and PCP 106. The controller 122 may be in communication with a source 120. The source 120 may include a DVD or blu ray player, cable signal, internet signal, computer, or any other signal capable of providing image data to the system 100.

The backlight 102 may selectively illuminate the stereoscopic flat panel display system 100. The LC panel 104 may modulate the light incident from the backlight 102. The PCP 106 may alter the state of the modulated light incident from the LC panel 104. The PCP 106 may selectively transform the state of polarization (SOP) of the modulated light from the LC panel 104 in synchronization with the LC panel update and backlight illumination.

The PCP 106 may be a segmented PCP having a plurality of polarization control segments 116. Thus, the PCP 106 may be addressed segment-by-segment. The present disclosure seeks to address the issue of perceptible lines between the segments of a PCP such as the PCP 116 illustrated in FIG. 1. However, it should be understood that the principles disclosed and claimed herein are broad enough to encompass other types of segmented PCPs for stereoscopic displays.

In an embodiment, the backlight 102 may be a spatially controllable backlight having a plurality of illuminating backlight portions 112. In another embodiment, the backlight 102 may be a globally selectively illuminated backlight. In still another embodiment, the backlight 102 may be globally (but not selectively) illuminated backlight. Thus, the backlight may illuminate portion-by-portion (e.g., a spatially controllable backlight), may be selectively illuminated (i.e., selectively turned on or off), or may be illuminated when the system is on (i.e., always illuminated when the system's power is on).

The LC panel 104 may show image content associated with a right- or left-eye view whose polarization is affected by the PCP 106. The right- and left-eye views may be displayed sequentially on the LC panel 104 and thus, at times, while the LC panel 104 is being updated, the LC panel 104 may show portions of both the right- and left-eye views. The PCP 106 and/or the backlight 102 may be driven in synchronization to provide different polarization states for the displayed images.

Each of a viewer's eyes would see one of the images by wearing polarization selective eyewear 108, each lens of which would act to block the light of the incorrect image for a given eye. In general, the eyewear 108 may comprise any polarization analyzing form just so long as it (preferably achromatically) blocks the polarization state of the undesired image. Most commonly, circularly polarized eyewear may be employed comprising a polarizer and single quarter wave retarder oriented at 45 degrees to the polarization axis, consistent with current RealD cinema eyewear.

In an embodiment, the stereoscopic flat panel display system 100 may be operated time-sequentially at a rate in excess of the eye's flicker frequency threshold of about 50 frames per second. In some embodiments, acceptable performance is achieved at 60 Hz per eye—resulting in the system 100 displaying images at 120 Hz.

Figure 2:
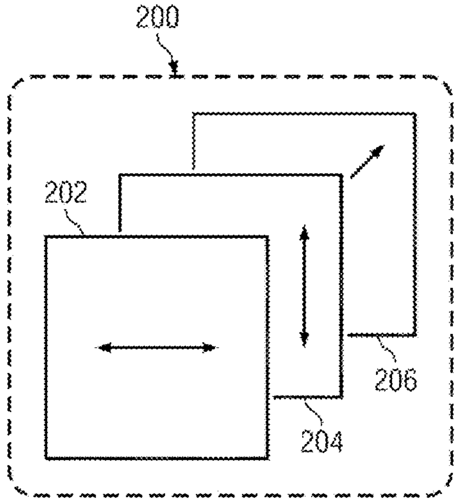
FIG. 2 is a schematic diagram illustrating an exemplary polarization control panel (PCP), in accordance with the present disclosure.

FIG. 2 is a schematic diagram illustrating an exemplary PCP 200 employing a single liquid crystal modulation element 204. In this example, the PCP 200 may include a polarizer 206, a zero to half-wave retardation modulator or switch panel 204, and a quarter wave plate retarder 202. Here, the zero twist LC zero to half-wave retardation modulator 204 is oriented at 45 degrees to an output polarization direction of modulated light from an LC modulation panel. The fixed quarter wave retarder 202 is oriented at 90 degrees to the PCP 200 axis of orientation, and located in the output light path of the PCP 200 to allow modulation between opposite quarter wave retardation states (i.e., left- and right-handed circularly polarized light). If the modulating panel 104 provides sufficiently well polarized light with its polarization angle oriented at 45 degrees, then the polarizer 206 may be omitted. Alternatively, if the modulating panel 104 provides light polarized at some other angle, such as vertical or horizontal, the polarizer 206 may be replaced with a polarization rotating film, or films such as is known in the art. In either case, the intent is to efficiently provide the liquid crystal modulating element 204 with linearly polarized light oriented at 45 degrees to the chosen alignment direction of the liquid crystal in retardation modulator 204.

This exemplary PCP 200 configuration may be preferred over two crossed LC cells, like the approach used in cinemas, since it offers significant cost advantages. The zero twisted retardation modulator 204 is capable of imparting two retardation levels separated by a half-wave. The first retardance state of the modulator 204 is preferably close to zero retardation. Laminated to this cell is the quarter wave retarder 202 having effectively quarter-wave retardance oriented at ninety degrees. The combination of the modulator 204 and the fixed retarder 202 switches polarized light between substantially orthogonal circularly polarized states. Note that the retarder 202 may be chosen to compensate for the residual retardance of the modulator 204 in its low retardation state. This exemplary PCP 200 allows for a system that can use passive eyewear (e.g., as used in the cinema or passive stereoscopic) with reasonable performance. Improved performance may mean further manipulation of the input polarization state and reorientation of modulator elements not shown here for the sake of clarity. More complex direct view stereoscopic display systems, such as those with biaxial retarders may also be considered for improved off-axis viewing performance. See, for example, those stereoscopic display systems taught in commonly-owned U.S. Pat. App. Ser. No. 61/352,773, entitled "Stereoscopic Liquid Crystal Display Systems," filed Jun. 8, 2010, and as taught in commonly-owned U.S. patent application Ser. No. 61/306,897, entitled "Plastic Liquid Crystal Polarization Switch For Direct View Stereoscopic Display Stereoscopic Liquid Crystal Display Systems," filed Feb. 22, 2010, both of which are herein incorporated by reference.

The PCP 200 may be attached to an LC panel using a refractive indexed matched adhesive which would significantly reduce internal reflections enhancing optical clarity. As with any adhesive technique, however, it is preferred to reduce any stress-induced birefringence as this may alter the expected polarization states and thus compromise performance. Separate PCP 200 attachment is also an option.

As discussed, a time-multiplexed stereoscopic display may be made by sequentially modulating the polarization state of light leaving a rapidly switching display, such as a LCD display. Many displays are driven by updating the image on a row-by-row raster. This means that, during this raster update, regions of the display may be showing simultaneously image data intended for the left and right eyes. For this reason, the polarization modulator is preferably separated into segments, or stripes, aligned so that the stripes can be switched in a sequence that corresponds to the update of the image data. The use of a segmented modulator is one important technique to control the level of undesirable crosstalk between left and right image data. Other mechanisms for control of crosstalk are disclosed in RealD's U.S. patent application Ser. No. 12/985,250, which is incorporated herein by reference.

There are various ways to construct a polarization control panel (or segmented polarization modulator) involving different liquid crystal modes, such as twisted nematic, Pi mode, ECB mode, etc., and to output polarization schemes such as left/right circularly polarized and crossed linearly polarized states. In general, the liquid crystal modes of the PCP are driven with a "high" voltage to direct the light into one polarization state, and a "low" voltage to direct the light into the orthogonal polarization state. The specific choice of these voltages is made depending on the details of the design and construction of the PCP, including its LC mode, cell gap, pre-tilt angle and LC fluid.

Figure 3:
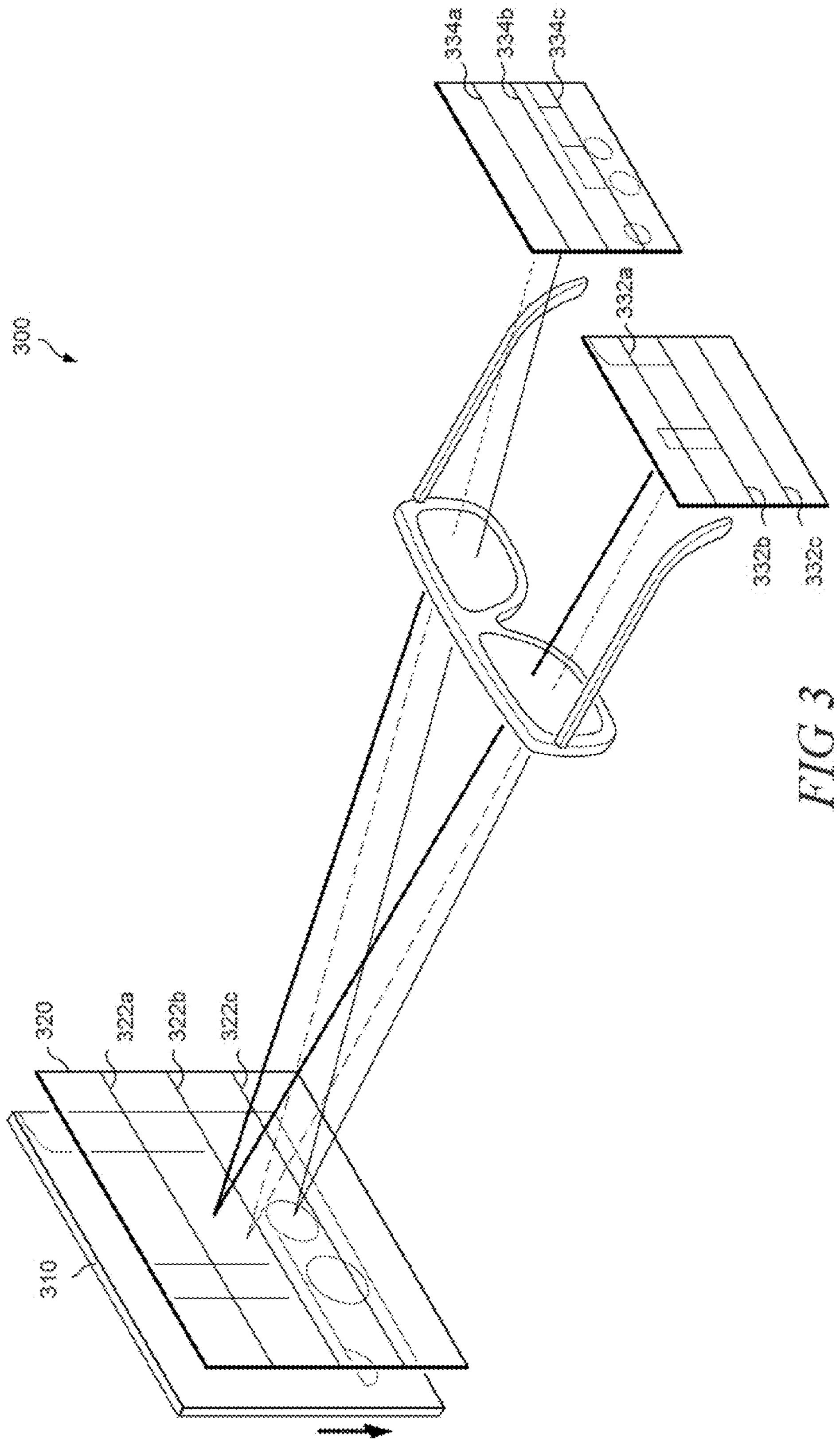
FIG. 3 is a schematic diagram of an exemplary polarization control panel for a stereoscopic display having a plurality of polarization control segments, in accordance with the present disclosure.
Figure 4:
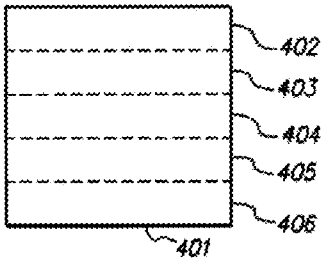
FIG. 4 (PRIOR ART)
FIG. 4 is a schematic diagram of a conventional Byatt modulator.
Figure 5:
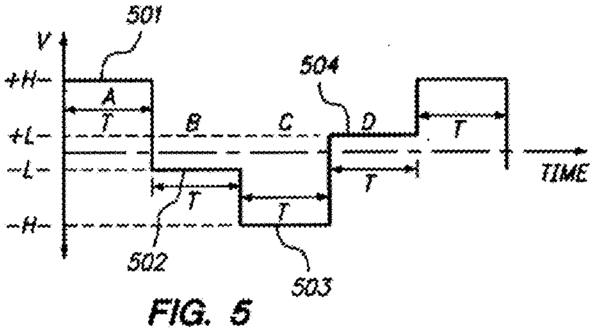
FIG. 5 (PRIOR ART)
FIG. 5 is a schematic waveform diagram illustrating Lipton's known drive scheme for driving the Byatt modulator illustrated in FIG. 4.

FIG. 3 is a schematic diagram of an exemplary polarization control panel 300 for a stereoscopic display having a plurality of polarization control segments, illustrating how a segmented or scrolling PCP 320 may be prone to visible segment boundaries. For example, boundaries 322*a*, 322*b*, and 322*c* may be visible in the left-eye view as 332*a*, 332*b*, 332*c* and right-eye view 334*a*, 334*b*, 334*c*, as shown. Such systems employing scrolling PCPs are prone to visible segment boundaries, since in general, the LC at the boundaries does not switch with the rest of the PCP LC.

Although the use of a segmented PCP confers significant benefit, there is the possibility that the boundaries between the segments may be visible under certain viewing conditions or with certain image content. Typically, the PCP has a single large transparent "common" electrode on one wall of the LC cell, and has a number of segments of transparent conductor on the other wall. The segments are individually electrically controlled to drive the LC at each segment to its desired state. Typically the segments are fashioned from a single large transparent conductor by removing, by etching or laser ablation, thin strips of the conductive coating from an initially un-patterned sheet. It is relatively straightforward, with contemporary fabrication techniques, to achieve electrode gap sizes of the order of 10 microns. It seems that, with these relatively fine gaps between the electrodes, it is not the effect of the gap, itself, that is visible but, instead, the effect of some disruption to the liquid crystal orientation in the vicinity of the gap. Physical techniques may be employed to minimize visible segment boundaries in a polarization control panel, as taught in commonly-owned U.S. patent appllication Ser. No. 12/853,273, entitled "Improved Segmented Polarization Control Panel," filed Aug. 9, 2010.

The presence of visible segment boundaries is a distracting visual artifact. Once the viewer sees the appearance of lines across the display, he or she tends to become irritated by them, and seems to find them easier to perceive in future. The present disclosure seeks to address this problem with the use of a transition voltage placed in the drive scheme, as elaborated in the following description.

First Exemplary Embodiment

Figure 6:
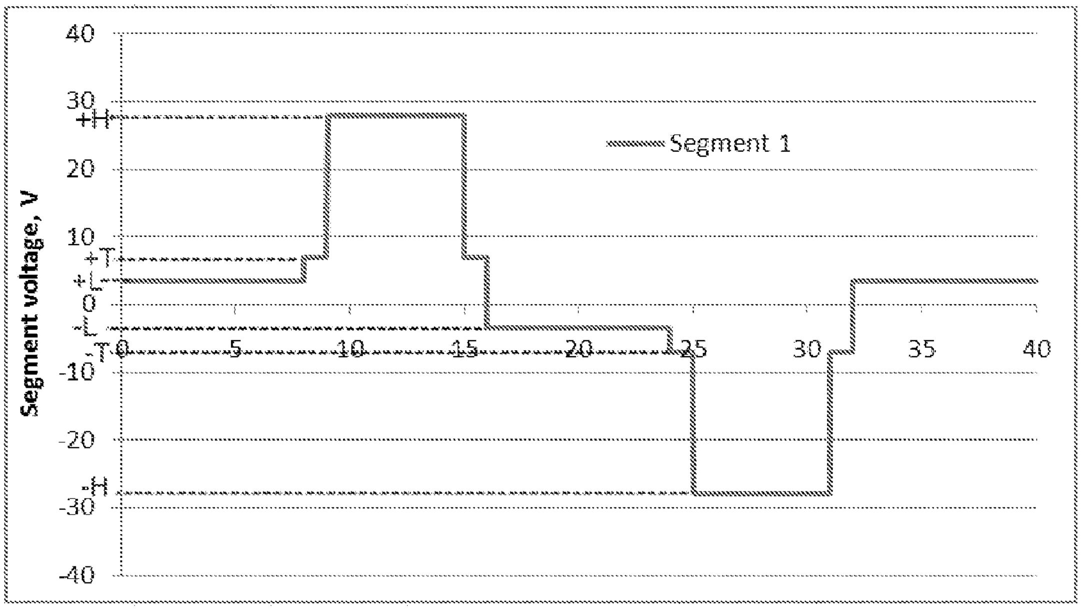
FIG. 6 is a schematic waveform diagram illustrating an exemplary drive waveform of a segment in a first embodiment in accordance with the disclosed principles for driving a polarization modulator.

FIG. 6 is a schematic waveform diagram illustrating an exemplary drive waveform of a segment in a first embodiment for driving a polarization modulator. For the sake of clarity, it has been assumed that a frame for one eye is displayed every 8 mS and the time between segment activations is 1 ms. In reality, however, the frame time may likely be 8.333 mS and the segment time may be about 800 μS. The present disclosure is adaptable to various timing schemes.

In operation, at time t=0, the sequential waveform is shown in this figure to start at a segment drive voltage of +L volts, which may be +3.5 v. At time t=8 ms, the drive voltage may be increased to a transition voltage +T, which may be +7 v, but may alternatively be in a range of voltages that sufficiently drives the liquid crystal without creating a lateral electric field of a significant magnitude to significantly affect the liquid crystal of the adjacent polarization modulation segment. Such a range may be from 6 to 10 volts, in the exemplary case presented here. The transition voltage may be applied for a transition period, in this example, a millisecond, before the +H segment drive voltage may be applied at +28 v. The +H voltage decisively switches the polarization modulator to a first polarization modulating state, and may maintain that drive voltage until t=15.

The present disclosure recognizes that by applying a transition voltage +T for this short period before switching from the −H drive voltage to the +H drive voltage (or −T for the other half of the duty cycle), that the lines between segments are desirably much less noticeable by a viewer. This is because use of the transition voltage on a polarization modulation segment that is adjacent to a polarization modulation segment driven at an opposite state causes less disruption to the adjacent modulation segment, yet accomplishes much of the switching desired of the polarization modulation segment. It is important to note the effect of the "lateral" or "fringing" field between two segments. The LC cell is generally designed to respond optimally to electric fields that are normal to the surfaces of the cell walls. When segment electrodes are driven to different voltages, then the electric field can have a very large component that is not normal to the cell walls. Specifically, close to the boundary of two segments at different voltages, the electric field is aligned between the two segments, and is less influenced by the common electrode. This, in turn, influences the liquid crystal that is in the vicinity.

In switching the polarization modulator to a second polarization modulating state, the drive voltage may optionally be driven from +H to −L, via a +T volt transition for a transition period, of, for example, a millisecond. Such a transition provides a desirable viewing result, but is optional, in that +H could be driven from −L directly without the +T transition.

The opposite half of the duty cycle starts at t=16, and −L is applied to the polarization modulating segment until t=24, at such time, −T may be applied for the transition time of 1 millisecond. At t=25, −H is applied to decisively switch the polarization modulation segment to the second polarization modulating state. At t=31, the second polarization modulating state may be switched to the first polarization modulating state in a similar manner to that described, optionally being driving from −H to +L via the −T transition voltage for a transition period of, for example, a millisecond. The duty cycle may continue from switching from the first polarization modulation state to the second state, and vice versa.

Example voltages for the various states are shown in Table 1 below.

TABLE 1

| Voltage State | Exemplary Drive Voltage |
|---|---|
| +H | +28 v |
| +T | +7 v |
| +L | +3.5 v |
| −L | −3.5 v |
| −T | −7 v |
| −H | −28 v |

It should be understood that these are exemplary drive voltages and timings, and that alternative voltages and timings within reasonable ranges that accomplish the objectives of the present disclosure may be used. It should also be recognized that although this has been described for a Pi cell implementation, various different types of liquid crystal-based polarization modulators may be used (e.g., twisted-nematic, ECB mode, etc.) and that drive voltages and timings may vary for each different type of polarization modulator. It should also be understood that benefit may be realized with the use of only one of the transition phases at either the beginning or end of the "high" voltage period depending on the balance between boundary visibility and polarization contrast desired.

Figure 7:
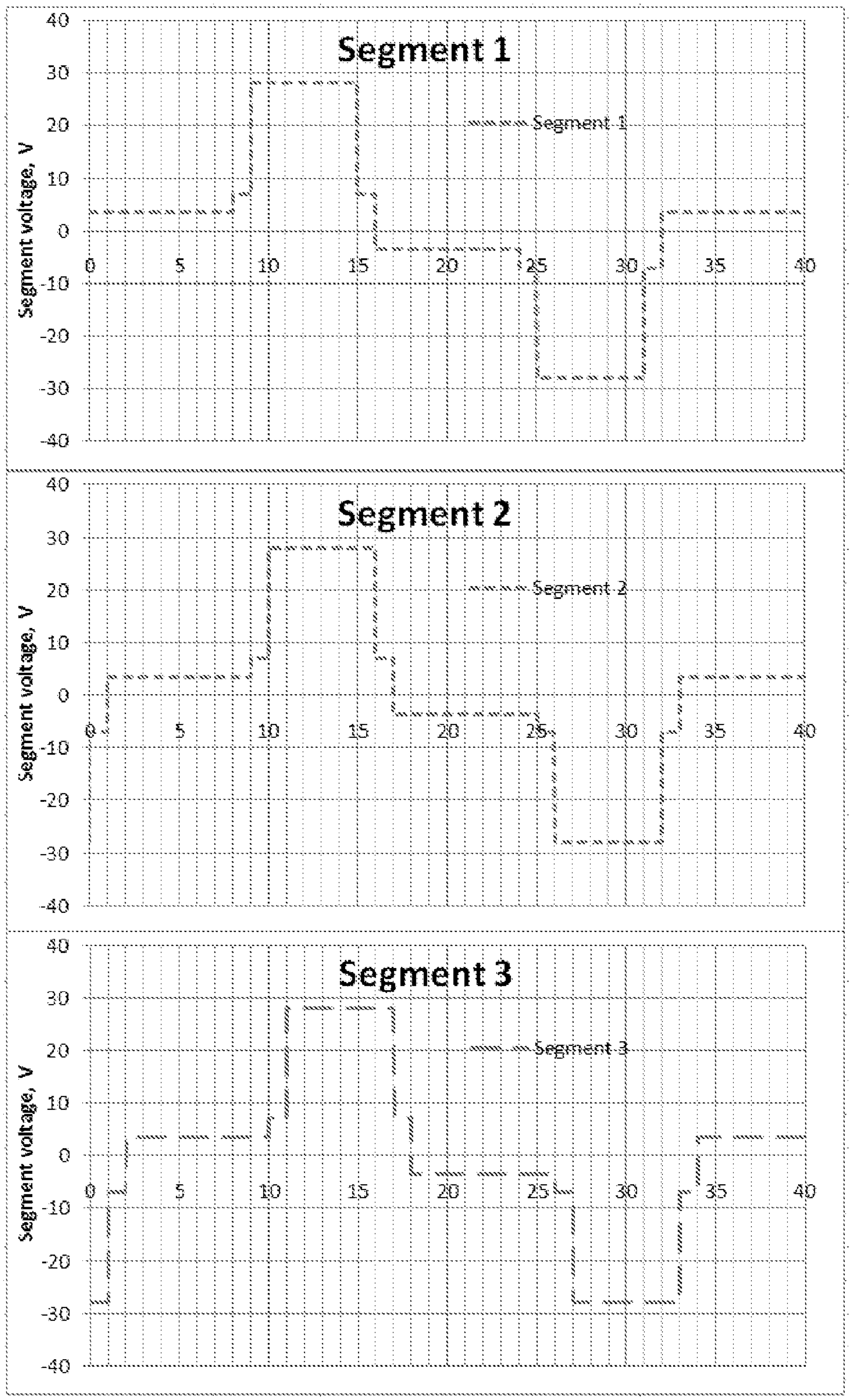
FIG. 7 is a set of schematic waveform diagrams illustrating the drive scheme of FIG. 6 being applied to adjacent polarization modulator segments and exemplary timing between the drive schemes, in accordance with the present disclosure.

FIG. 7 is a set of schematic waveform diagrams illustrating the drive scheme of FIG. 6 being applied to adjacent polarization modulator segments and exemplary timing between the drive schemes. As illustrated in this figure, the second polarization modulation segment may be driven with a 1 ms lag behind the first, and the third polarization modulation segment may be driven with a 2 ms lag behind the first, and so on, to create a scrolling polarization modulator that is in synchronization with the LC modulation panel. Although three waveforms are shown, this drive scheme may be repeated for following (and preceding) polarization modulator segments, and this figure should not be read to imply a limitation in the number of polarization modulator segments.

Second Exemplary Embodiment

Figure 8:
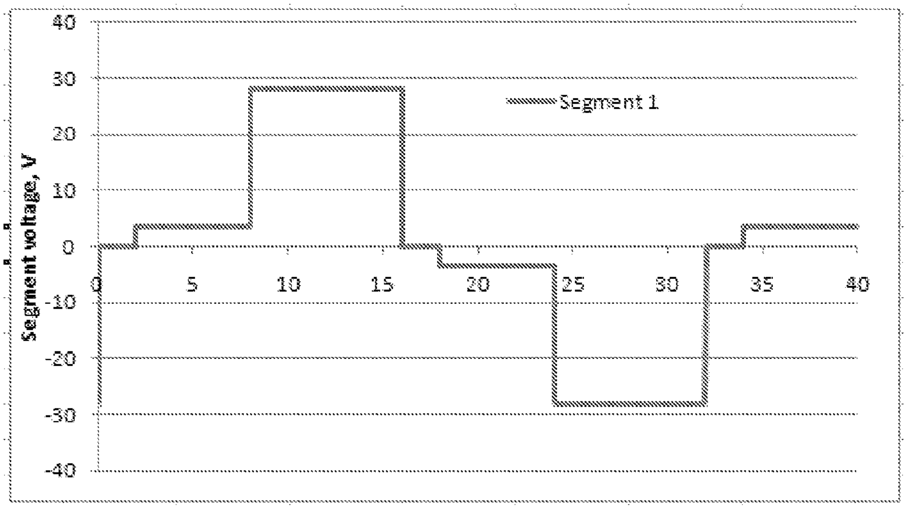
FIG. 8 (PRIOR ART)
FIG. 8 is a schematic waveform diagram illustrating another known drive waveform for driving a polarization modulator in accordance with the disclosed principles.

FIG. 8 is a schematic waveform diagram illustrating another known drive waveform for driving a polarization modulator. This is slightly modified from the waveform disclosed in Lipton '345, in that in driving from −H to +L (and from +H to −L), the drive voltage on the polarization modulator is held to zero volts for a two millisecond period, as shown. This is because the liquid crystal responds to the balance between its internal elastic forces and the externally applied electric forces and it is found that the fastest way to get a LC system to a lower-voltage equilibrium is to apply the lowest voltage available (0V) for a short period of time before applying the steady-state low voltage.

Figure 9:
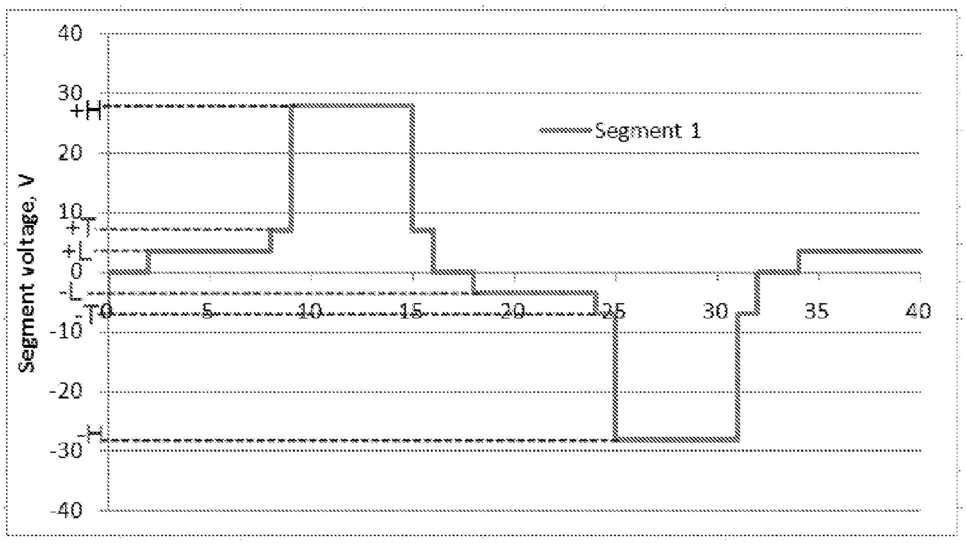
FIG. 9 is a schematic waveform diagram illustrating an alternative exemplary drive waveform of a segment in a second embodiment for driving a polarization modulator, in accordance with the present disclosure.

FIG. 9 is a schematic waveform diagram illustrating an alternative exemplary drive waveform of a segment in a second embodiment for driving a polarization modulator in accordance with the disclosed principles. This exemplary embodiment modifies the known drive waveform of FIG. 8 to include transition drive voltages +T and −T in the duty cycle.

In operation, at time t=0, the sequential waveform is shown in this figure to start at a segment drive voltage of 0 volts. At time t=2 ms, the drive voltage may be increased to +L, which may be 3.5 v. At time t=8 ms, the drive voltage may be increased to a transition voltage +T, which may be +7 v, but may alternatively be in a range of voltages that is of a magnitude that sufficiently actuates the liquid crystal in the polarization modulation segment without creating an electric field significant enough to affect the liquid crystal of the adjacent polarization modulation segment. The transition voltage may be applied for a transition period, in this example, a millisecond, before the +H segment drive voltage may be applied at +28 v (at t=9 ms). The +H voltage decisively switches the polarization modulator to a first polarization modulating state, and may maintain that drive voltage until t=15. As may be seen in the first and second described exemplary embodiments, the exemplary period of the duty cycle is 40 ms, although it should be apparent to those skilled in the art, that other periods may be implemented—faster or slower—that are sequentially timed with the addressing scheme of the LC modulating panel 104, in concert with the illumination scheme of backlight 102.

The present disclosure recognizes that by applying a transition voltage +T for this short period between switching from the +L drive voltage to the +H drive voltage (or −T for the other half of the duty cycle), that the lines between segments are desirably much less noticeable by a viewer. This is for the same reason as described above.

At t=15, the drive waveform goes from +H to +T for a millisecond, then to 0 v for 2 ms. At t=18, −L is applied to the polarization modulating segment until t=24, at such time, −T may be applied for the transition time of 1 millisecond. At t=25, −H is applied to decisively switch the polarization modulation segment to the second polarization modulating state. At t=31, the second polarization modulating state may be switched to the first polarization modulating state in a similar manner to that described, optionally being driving from −H to +L via the −T transition voltage for a transition period of a millisecond, then 0 v for 2 ms. The duty cycle may continue from switching from the first polarization modulation state to the second state, and vice versa.

Example voltages for the various states for this second exemplary embodiment are shown in Table 2 below:

TABLE 2

| Voltage State | Exemplary Drive Voltage |
|---|---|
| +H | +28 v |
| +T | +7 v |
| +L | +3.5 v |
| 0 | 0 v |
| −L | −3.5 v |
| −T | −7 v |
| −H | −28 v |

It should be understood that these are exemplary drive voltages, and that alternative voltages within reasonable ranges that accomplish the objectives of the present disclosure may be used. It should also be understood that any of the voltages described in the exemplary embodiments may be replaced by an A.C. voltage of equivalent RMS value. Similarly, for nematic liquid crystals it should be understood that, since these materials respond to the RMS value of the applied voltage, a positive voltage can be replaced by a negative voltage with generally equivalent results. For example, if part way through the high positive pulse, the voltage was changed to the high negative value for the remainder of that pulse duration, the liquid crystal's behavior would be substantially unchanged. Many such adaptions can be made by one of normal skill in the art. It should also be recognized that various different types of liquid crystal-based polarization modulators may be used (e.g., Pi cells, twisted-nematic, ECB mode, et cetera) and that drive voltages may vary for each different type.

Figure 10:
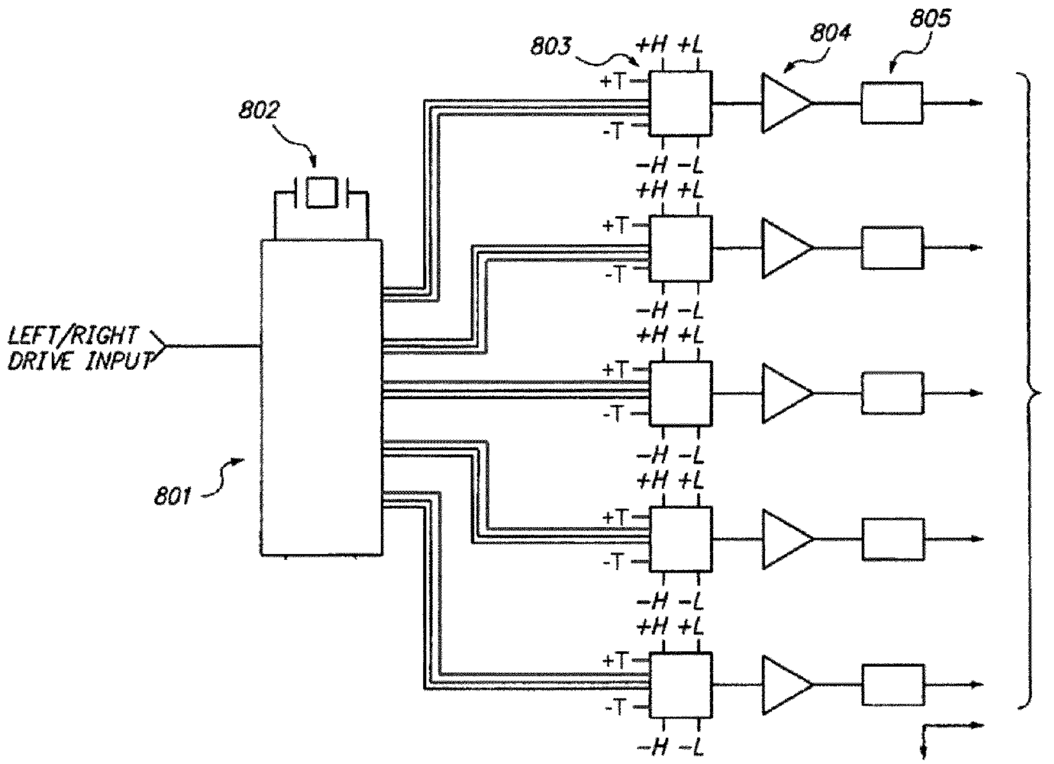
FIG. 10 is a schematic block diagram of exemplary circuitry to drive a segmented polarization modulator in accordance with the disclosed principles.

FIG. 10 is a schematic block diagram of exemplary circuitry to drive a segmented polarization control panel. The circuitry may include a single-chip microcomputer (MCU) 801, a crystal 802, a plurality of 8:1 analog multiplexors 803, a plurality of amplifiers 804, and a plurality of filters 805, arranged as shown. This circuit is similar in principle to the circuit disclosed in Lipton '345, herein incorporated by reference. A person of skill in the art should recognize that the addition of the +T and −T volt states necessitates an additional two channels of voltage input into the analog multiplexors 803, thus here an 8:1 (or 6:1) analog multiplexor may be selected.

In operation, the circuit receives as its input a Left/Right drive signal that is high when a left eye image is visible and low when a right eye image is visible. This signal is processed by a single-chip microcomputer (MCU) 801, such as a Motorola MC68HCO5. The input signal may switch coincident with a tile vertical sync pulse. Normally this is at or very near the beginning of a vertical blanking interval. After the blanking interval comes the active video, and the pattern repeats.

The MCU 801 may be interrupted by edges of the input signal. Using the on-chip timing resources, the MCU 801 measures the time between these edges. The accuracy of this timing is a function of the frequency of crystal 802, in this case 8 MHz, which results in a basing time-keeping accuracy of 1 microsecond. The MCU 801 is thus executing a software Phase-Locked-Loop (PLL).

Once the internal timing is established, the MCU 801 uses this information to create the appropriate transition points for each segment. First, the field time is calculated. This is the length of time between transitions of the input signal. Second, the blanking time may be calculated (for example at 1⁄16 of the field time). This value is an acceptable approximation for all resolutions and display modes in common use. Next, the segment time may be calculated (for example, at three times the blanking time or 3⁄16 of the field time). Under these examples, the total field is 1⁄16 blanking plus five time 3⁄16 segments.

In this case, each segment should be driven to its proper state before the LC modulating panel is addressed past the beginning of the displayed segment area. The selected value of driving the segment to its proper state (e.g., 2 milliseconds in advance) is a function of the optical transition speed of the segmented PCP. Thus, the first segment should switch at 2 ms minus the blanking time before the input signal edge. Likewise, the second segment may be driven to switch 3⁄16 of the field time later, and so on.

The MCU 801 outputs three status bits per segment, indicating which input to switch to (e.g., +H, +T, +L, −H, −T, −L, and optionally in the case of the second embodiment, 0 v). Each segment has a driver circuit having an 8:1 analog multiplexor 803 (in which 6 or 7 of the 8 inputs are used depending on whether the first or second embodiment drive scheme is being used), an amplifier 804, and a filter 805. The 8:1 MUX 803 takes the three status bits and routes one of six (or seven) analog voltages into the amplifier 804.

Normal operating voltages for the segmented PCP are in the area of 56 volts peak-to-peak. Thus, the high and low operating voltages the amplifier 804 is required to deliver to the cell are +28 and −28 volts. The MUX 803 would have to switch these voltages. However, if the amplifier 804 is given a gain of −10, then the MUX 803 only needs to switch voltages of +2.8 and −2.8 for the +H and −H drive voltages, respectively. This allows the use of a much less expensive multiplexor while having a tiny increase in the cost of the amplifier circuit. In this case, the amplifier–gain is −10 and the six voltages switched by the MUX 803 are: (1) +2.8 v for +H, (2) −2.8 v for −H, (3) +0.7 v for +T, (4) −0.7V for −T, (5) +0.35 v for +L, and (6) −0.35 v for −L. Of course, many other drive schemes and alternatives may be used.

The output of the amplifier 804 is filtered before reaching the segmented PCP. Low-pass filters 805 may be used to suppress emissions for regulatory certification purposes, rather than to have an effect on the segmented PCP.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than approximately one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A polarizing modulator for an electronic stereoscopic display system having a sequentially scanning display, the polarizing modulator comprising:

a plurality of segments each containing liquid crystal material and arranged contiguously in a direction of the sequential scan;

driving circuitry coupled to each segment and configured to individually drive liquid crystal in each segment to a desired polarization modulating state by:

providing a positive low drive voltage to a first segment for a first time period, the positive low drive voltage insufficient to switch the first segment to a first polarization modulating state;

increasing the positive low drive voltage to provide a first positive transition voltage to the first segment for a first transition time period, the first positive transition voltage sufficient to drive liquid crystal in the first segment towards the first polarization modulating state without creating a lateral electric field of significant magnitude to significantly affect liquid crystal in a second segment immediately adjacent to the first segment; and increasing the first positive transition voltage to provide a positive high drive voltage to the first segment for a second time period, the positive high drive voltage sufficient to decisively switch the first segment of the polarizing modulator to the first polarization modulating state.

2. A polarizing modulator in accordance with claim 1, further comprising decreasing the positive high drive voltage to provide a second positive transition voltage to the first segment for a second transition time period, the second positive transition voltage substantially equal to the first positive transition voltage.

3. A polarizing modulator in accordance with claim 2 wherein the driving circuitry is further configured to provide a zero voltage to the first segment immediately after providing the second positive transition voltage.

4. A polarizing modulator in accordance with claim 1, wherein the positive low drive voltage is about +3.5 volts, and wherein the first time period is about 8 milliseconds.

5. A polarizing modulator in accordance with claim 1, wherein the first positive transition voltage is about +6 to +10 volts, and wherein the first transition time period is about 1 millisecond.

6. A polarizing modulator in accordance with claim 1, wherein the positive high drive voltage is about +28 volts, and wherein the second time period is about 6 milliseconds.

7. A polarizing modulator in accordance with claim 1, wherein the driving circuitry is further configured to provide a zero voltage to the first segment immediately prior to providing the positive low drive voltage.

8. A polarizing modulator in accordance with claim 7, wherein the zero voltage is provided for about 2 milliseconds.

9. A polarizing modulator in accordance with claim 1, wherein the driving circuitry is further configured to:

provide a negative low drive voltage to the first segment, after providing the positive high drive voltage, for a third time period, the negative low drive voltage insufficient to switch the first segment to a second polarization modulating state;

increase the negative low drive voltage to provide a first negative transition voltage to the first segment for a third transition time period, the first negative transition voltage sufficient to drive liquid crystal in the first segment towards a second polarization modulating state without creating a lateral electric field of significant magnitude to significantly affect liquid crystal in the adjacent second segment; and increase the first negative transition voltage to provide a negative high drive voltage to the first segment for a fourth time period, the negative high drive voltage sufficient to decisively switch the first segment of the polarizing modulator to the second polarization modulating state.

10. A polarizing modulator in accordance with claim 9, wherein the driving circuitry is further configured to decrease the negative high drive voltage to provide a second negative transition voltage to the first segment for a fourth transition time period, the second negative transition substantially equal to the first negative transition voltage.

11. A polarizing modulator in accordance with claim 10, wherein the driving circuitry is further configured to provide a zero voltage to the first segment immediately after providing the second transition voltage.

12. A polarizing modulator in accordance with claim 9, wherein the first segment is driven to positive and negative high states by the positive and negative high drive voltages in synchrony with an image for a selected eye, and driven to positive and negative low states by the positive and negative low drive voltages in synchrony with an image for a non-selected eye.

13. A polarizing modulator in accordance with claim 9, wherein the driving circuitry is further configured to provide a zero voltage to the first segment immediately prior to providing the negative low drive voltage.

14. A polarizing modulator in accordance with claim 9, wherein the driving circuitry is further configured to drive a second segment in substantially the same manner as the first segment with a 1 millisecond lag behind the first segment to create a scrolling polarization modulator in synchronization with a scrolling liquid crystal modulation panel.

15. A method for driving a polarizing modulator for an electronic stereoscopic display system having a sequentially scanning display comprising a plurality of segments each containing liquid crystal material and arranged contiguously in a direction of the sequential scan, the method comprising:

providing a positive low drive voltage to a first segment for a first time period, the positive low drive voltage insufficient to switch the first segment to a first polarization modulating state;

increasing the positive low drive voltage to provide a first positive transition voltage to the first segment for a first transition time period, the first positive transition voltage sufficient to drive liquid crystal in the first segment towards the first polarization modulating state without creating a lateral electric field of significant magnitude to significantly affect liquid crystal in a second segment immediately adjacent to the first segment; and increasing the first positive transition voltage to provide a positive high drive voltage to the first segment for a second time period, the positive high drive voltage sufficient to decisively switch the first segment of the polarizing modulator to the first polarization modulating state.

16. A method in accordance with claim 15, further comprising decreasing the positive high drive voltage to provide a second positive transition voltage to the first segment for a second transition time period, the second positive transition voltage substantially equal to the first positive transition voltage.

17. A method in accordance with claim 16, the method further comprising providing a zero voltage to the first segment immediately after providing the second positive transition voltage.

18. A method in accordance with claim 15, wherein the positive low drive voltage is about +3.5 volts, and wherein the first time period is about 8 milliseconds.

19. A method in accordance with claim 15, wherein the first positive transition voltage is about +6 to +10 volts, and wherein the first transition time period is about 1 millisecond.

20. A method in accordance with claim 15, wherein the positive high drive voltage is about +28 volts, and wherein the second time period is about 6 milliseconds.

21. A method in accordance with claim 15, the method further comprising providing a zero voltage to the first segment immediately prior to providing the positive low drive voltage.

22. A method in accordance with claim 21, wherein the zero voltage is provided for about 2 milliseconds.

23. A method in accordance with claim 15, further comprising:

providing a negative low drive voltage to the first segment for a third time period, the negative low drive voltage insufficient to switch the first segment to a second polarization modulating state;

increasing the negative low drive voltage to provide a first negative transition voltage to the first segment for a third transition time period, the first negative transition voltage sufficient to drive liquid crystal in the first segment towards a second polarization modulating state without creating a lateral electric field of significant magnitude to significantly affect liquid crystal in the adjacent second segment; and increasing the first negative transition voltage to provide a negative high drive voltage to the first segment for a fourth time period, the negative high drive voltage sufficient to decisively switch the first segment of the polarization modulator to the second polarizing modulator state.

24. A method in accordance with claim 23, further comprising decreasing the negative high drive voltage to provide a second negative transition voltage to the first segment for a fourth transition time period, the second negative transition substantially equal to the first negative transition voltage.

25. A method in accordance with claim 24, the method further comprising providing a zero voltage to the first segment immediately after providing the second negative transition voltage.

26. A method in accordance with claim 23, wherein the first segment is driven to positive and negative high states by the positive and negative high drive voltages in synchrony with an image for a selected eye, and driven to positive and negative low states by the positive and negative low drive voltages in synchrony with an image for a non-selected eye.

27. A method in accordance with claim 23, the method further comprising providing a zero voltage to the first segment immediately prior to providing the negative low drive voltage.

28. A method in accordance with claim 23, further comprising driving the second segment in substantially the same manner as the first segment with a 1 millisecond lag behind the first segment to create a scrolling polarization modulator in synchronization with a scrolling liquid crystal modulation panel.

29. A polarizing modulator for an electronic stereoscopic display system having a sequentially scanning display, the polarizing modulator comprising:

a plurality of segments each containing liquid crystal material and arranged contiguously in a direction of the sequential scan;

driving circuitry coupled to each segment and configured to individually drive liquid crystal in each segment to a desired polarization modulating state by:

providing a positive low drive voltage to a first segment for a first time period, the positive low drive voltage insufficient to switch the first segment to a first polarization modulating state;

increasing the positive low drive voltage to provide a first positive transition voltage to the first segment for a first transition time period, the first positive transition voltage sufficient to drive liquid crystal in the first segment towards the first polarization modulating state without creating a lateral electric field of significant magnitude to significantly affect liquid crystal in a second segment immediately adjacent to the first segment;

increasing the first positive transition voltage to provide a positive high drive voltage to the first segment for a second time period, the positive high drive voltage sufficient to decisively switch the first segment of the polarizing modulator to the first polarization modulating state;

providing a negative low drive voltage to the first segment for a third time period, the negative low drive voltage insufficient to switch the first segment to a second polarization modulating state;

increasing the negative low drive voltage to provide a first negative transition voltage to the first segment for a third transition time period, the first negative transition voltage sufficient to drive liquid crystal in the first segment towards a second polarization modulating state without creating a lateral electric field of significant magnitude to significantly affect liquid crystal in the adjacent second segment; and increasing the first negative transition voltage to provide a negative high drive voltage to the first segment for a fourth time period, the negative high drive voltage sufficient to decisively switch the first segment of the polarizing modulator to the second polarization modulating state.

30. A polarizing modulator in accordance with claim 29, wherein the driving circuitry is further configured to:

decrease the positive high drive voltage to provide a second positive transition voltage to the first segment for a second transition time period, prior to providing the low negative drive voltage, the second positive transition voltage substantially equal to the first positive transition voltage; and decrease the negative high drive voltage to provide a second negative transition voltage to the first segment for a fourth transition time period, the second negative transition substantially equal to the first negative transition voltage.

31. A polarizing modulator in accordance with claim 29, wherein the positive low drive voltage is about +3.5 volts and the first time period is about 8 milliseconds, and wherein the positive high drive voltage is about +28 volts, and wherein the second time period is about 6 milliseconds.

32. A polarizing modulator in accordance with claim 29, wherein the first and second positive transition voltages are each about +6 to +10 volts, and wherein the first and second transition time periods are each about 1 millisecond.

33. A polarizing modulator in accordance with claim 29, wherein the driving circuitry is further configured to:

provide a zero voltage to the first segment immediately prior to providing the positive low drive voltage;

provide a zero voltage to the first segment immediately after providing the second positive transition voltage and prior to providing the negative low drive voltage; and provide a zero voltage to the first segment immediately after providing the second negative transition voltage.

34. A polarizing modulator in accordance with claim 33, wherein the zero voltages are each provided for about 2 milliseconds.

35. A polarizing modulator in accordance with claim 29, wherein the first segment is driven to positive and negative high states by the positive and negative high drive voltages in synchrony with an image for a selected eye, and driven to positive and negative low states by the positive and negative low drive voltages in synchrony with an image for a non-selected eye.

36. A polarizing modulator in accordance with claim 29, wherein the driving circuitry is further configured to drive a second segment in substantially the same manner as the first segment with a 1 millisecond lag behind the first segment to create a scrolling polarization modulator in synchronization with a scrolling liquid crystal modulation panel.

37. A method for driving a polarizing modulator for an electronic stereoscopic display system having a sequentially scanning display comprising a plurality of segments each containing liquid crystal material and arranged contiguously in a direction of the sequential scan, the method comprising:

providing a positive low drive voltage to a first segment for a first time period, the positive low drive voltage insufficient to switch the first segment to a first polarization modulating state;

increasing the positive low drive voltage to provide a first positive transition voltage to the first segment for a first transition time period, the first positive transition voltage sufficient to drive liquid crystal in the first segment towards the first polarization modulating state without creating a lateral electric field of significant magnitude to significantly affect liquid crystal in a second segment immediately adjacent to the first segment;

increasing the first positive transition voltage to provide a positive high drive voltage to the first segment for a second time period, the positive high drive voltage sufficient to decisively switch the first segment of the polarizing modulator to the first polarization modulating state;

providing a negative low drive voltage to the first segment for a third time period, the negative low drive voltage insufficient to switch the first segment to a second polarization modulating state;

increasing the negative low drive voltage to provide a first negative transition voltage to the first segment for a third transition time period, the first negative transition voltage sufficient to drive liquid crystal in the first segment towards a second polarization modulating state without creating a lateral electric field of significant magnitude to significantly affect liquid crystal in the adjacent second segment; and increasing the first negative transition voltage to provide a negative high drive voltage to the first segment for a fourth time period, the negative high drive voltage sufficient to decisively switch the first segment of the polarizing modulator to the second polarization modulating state.

38. A method in accordance with claim 37, further comprising:

decreasing the positive high drive voltage to provide a second positive transition voltage to the first segment for a second transition time period, prior to providing the negative low drive voltage, the second positive transition voltage substantially equal to the first positive transition voltage; and decreasing the negative high drive voltage to provide a second negative transition voltage to the first segment for a fourth transition time period, the second negative transition substantially equal to the first negative transition voltage.

39. A method in accordance with claim 37, wherein the positive low drive voltage is about +3.5 volts and the first time period is about 8 milliseconds, and wherein the positive high drive voltage is about +28 volts, and wherein the second time period is about 6 milliseconds.

40. A method in accordance with claim 37, wherein the first and second positive transition voltages are each about +6 to +10 volts, and wherein the first and second transition time periods are each about 1 millisecond.

41. A method in accordance with claim 37, further comprising:

providing a zero voltage to the first segment immediately prior to providing the positive low drive voltage;

providing a zero voltage to the first segment immediately after providing the second positive transition voltage and prior to providing the negative low drive voltage; and providing a zero voltage to the first segment immediately after providing the second negative transition voltage.

42. A method in accordance with claim 41, wherein the zero voltages are each provided for about 2 milliseconds.

43. A method in accordance with claim 37, wherein the first segment is driven to positive and negative high states by the positive and negative high drive voltages in synchrony with an image for a selected eye, and driven to positive and negative low states by the positive and negative low drive voltages in synchrony with an image for a non-selected eye.

44. A method in accordance with claim 37, wherein the method further comprises driving a second segment in substantially the same manner as the first segment with a 1 millisecond lag behind the first segment to create a scrolling polarization modulator in synchronization with a scrolling liquid crystal modulation panel.

45. A polarizing modulator for an electronic stereoscopic display system having a sequentially scanning display, the polarizing modulator comprising:

a plurality of segments each containing liquid crystal material and arranged contiguously in a direction of the sequential scan;

driving circuitry coupled to each segment and configured to individually drive liquid crystal in each segment to a desired polarization modulating state by:

providing a positive high drive voltage to the first segment for a first time period, the positive high drive voltage sufficient to decisively switch the first segment of the polarizing modulator to the first polarization modulating state;

decreasing the positive high drive voltage to provide a positive transition voltage to the first segment for a first transition time period, the positive transition voltage insufficient to drive liquid crystal in the first segment towards the second polarization modulating state and insufficient to create a lateral electric field of significant magnitude to significantly affect liquid crystal in a second segment immediately adjacent to the first segment; and decreasing the positive transition voltage toward zero voltage after the first transition time period;

wherein the drive circuitry is further configured to provide a negative low drive voltage to the first segment for a second time period, the positive low drive voltage insufficient to switch the first segment to the second polarization modulating state;

increase the negative low drive voltage to provide a first negative transition voltage to the first segment for a second transition time period, the first negative transition voltage insufficient to drive liquid crystal in the first segment towards the second polarization modulating state and insufficient to create a lateral electric field of significant magnitude to significantly affect liquid crystal in a second segment immediately adjacent to the first segment; and increase the first negative transition voltage to provide a negative high drive voltage to the first segment for a third time period, the negative high drive voltage sufficient to decisively switch the first segment of the polarizing modulator to the second polarization modulating state.

46. A polarizing modulator in accordance with claim 45, the driving circuitry further configured to decrease the negative high drive voltage to provide a second negative transition voltage to the first segment for a third transition time period, the second negative transition voltage substantially equal to the first negative transition voltage.

47. A polarizing modulator in accordance with claim 46, wherein the driving circuitry is further configured to:

provide a positive low drive voltage to the first segment, after providing the second negative transition voltage, for a fourth time period, the positive low drive voltage insufficient to switch the first segment to the first polarization modulating state;

increase the positive low drive voltage to provide a second positive transition voltage to the first segment for a third transition time period, the second positive transition voltage sufficient to drive liquid crystal in the first segment towards the first polarization modulating state without creating a lateral electric field of significant magnitude to significantly affect liquid crystal in the adjacent second segment; and increase the second positive transition voltage to provide the positive high drive voltage to the first segment for a fourth time period, the negative high drive voltage sufficient to decisively switch the first segment of the polarizing modulator to the first polarization modulating state.

48. A polarizing modulator in accordance with claim 47, wherein the driving circuitry is further configured to provide a zero voltage to the first segment immediately prior to providing the positive low drive voltage.

49. A polarizing modulator in accordance with claim 46, wherein the first segment is driven to positive and negative high states by the positive and negative high drive voltages in synchrony with an image for a selected eye, and driven to positive and negative low states by the positive and negative low drive voltages in synchrony with an image for a non-selected eye.

50. A polarizing modulator in accordance with claim 46, wherein the driving circuitry is further configured to drive a second segment in substantially the same manner as the first segment with a 1 millisecond lag behind the first segment to create a scrolling polarization modulator in synchronization with a scrolling liquid crystal modulation panel.

51. A polarizing modulator in accordance with claim 45, wherein the positive high drive voltage is about +28 volts, and wherein the second time period is about 6 milliseconds.

52. A polarizing modulator in accordance with claim 45, wherein the positive transition voltage is about +6 to +10 volts, and wherein the first transition time period is about 1 millisecond.

53. A polarizing modulator in accordance with claim 45, wherein the driving circuitry is further configured to provide a zero voltage to the first segment immediately after providing the positive transition voltage; wherein the zero voltage is provided for about 2 milliseconds.

* * * * *